(12) United States Patent
Gilbert et al.

(10) Patent No.: US 12,080,919 B2
(45) Date of Patent: Sep. 3, 2024

(54) ELECTRIFIED VEHICLE BATTERY HAVING CELLS WITH INTERNAL FUSIBLE LINKS

(71) Applicant: Ford Global Technologies, LLC, Dearborn, MI (US)

(72) Inventors: Allen Joseph Gilbert, Grosse Ile, MI (US); Satish B. Chikkannanavar, Canton, MI (US); Xiao Guang Yang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 520 days.

(21) Appl. No.: 17/538,055

(22) Filed: Nov. 30, 2021

(65) Prior Publication Data

US 2023/0170588 A1 Jun. 1, 2023

(51) Int. Cl.
*H01M 50/583* (2021.01)
*H01M 10/04* (2006.01)
*H01M 50/14* (2021.01)
*H01M 50/20* (2021.01)
*H01M 50/502* (2021.01)

(52) U.S. Cl.
CPC ..... *H01M 50/583* (2021.01); *H01M 10/0431* (2013.01); *H01M 50/14* (2021.01); *H01M 50/20* (2021.01); *H01M 50/502* (2021.01)

(58) Field of Classification Search
CPC .. H01M 50/583; H01M 50/502; H01M 50/20; H01M 50/14; H01M 10/0431
See application file for complete search history.

(56) References Cited

U.S. PATENT DOCUMENTS

| | | | |
|---|---|---|---|
| 4,879,187 A | 11/1989 | Biegger | |
| 5,146,150 A * | 9/1992 | Gyenes | H01M 50/581 320/112 |
| 5,204,194 A | 4/1993 | Miller et al. | |
| 10,573,876 B1 | 2/2020 | Zeng et al. | |
| 2010/0255351 A1 | 10/2010 | Ijaz et al. | |

(Continued)

FOREIGN PATENT DOCUMENTS

| | | | |
|---|---|---|---|
| DE | 102014216668 A1 | 3/2015 | |
| EP | 0313405 A1 | 4/1989 | |
| WO | WO-2011151981 A1 * | 12/2011 | H01M 2/105 |

OTHER PUBLICATIONS

Machine Translation of WO-2011151981-A1 (Jun. 3, 2024) (Year: 2024).*

(Continued)

*Primary Examiner* — Matthew J Merkling
(74) *Attorney, Agent, or Firm* — David B. Kelley; Brooks Kushman PC

(57) ABSTRACT

An electrified vehicle battery includes battery cells each having a container including a first jelly roll electrically connected to a second jelly roll by a fusible link with the first and second jelly rolls and the fusible link being disposed within the container and battery terminals electrically connected to the first jelly roll and extending from the container. The fusible link may be formed by a connector having a reduced cross-sectional area, which may correspond to one or more apertures extending through the connector. The fusible link may be coated with a ceramic material.

19 Claims, 4 Drawing Sheets

(56) References Cited

U.S. PATENT DOCUMENTS

2014/0272491 A1* 9/2014 Kohlberger ......... H01M 50/581
429/61

OTHER PUBLICATIONS

Ford to replace Kuga PHEV batteries following systemfires—Autocar, by Lawrence Allan; Oct. 30, 2020; 13 pages.
Hyundai will replace the batteries in 76,000 Kona EVs due to fire risk—Engadget, by Steve Dent; Feb. 24, 2021; 6 pages.
Understanding Safety-Related Field Failure (not Abuse) of Lithium-Ion Cells—TAIX by R. Stringfellow, B. Oh, D. Ofer, S. Sriramuluand B. Barnett; Nov. 2008; 36 Pages.

* cited by examiner

ELECTRIFIED VEHICLE BATTERY HAVING CELLS WITH INTERNAL FUSIBLE LINKS

TECHNICAL FIELD

This disclosure generally relates to a battery having integrated fusible links between cell components.

BACKGROUND

Electrified vehicles and various other applications may include a battery that includes a number of electrically connected cells to provide a desired overall battery voltage, current, and energy storage capacity. Each of the cells may also include a number of electrically connected components, such as stacks or jelly rolls, to produce the cell voltage and current at corresponding cell terminals. It is desirable to maintain voltage balance among connected components within a cell or among connected cells to prevent current flowing from higher voltage cells to lower voltage cells.

SUMMARY

In some configurations, an electrified vehicle battery including a plurality of battery cells, wherein, each cell includes a container, with a first jelly roll structure having cathode, separator, and anode layers disposed within the container, and a second jelly roll structure having cathode, separator, and anode disposed within the container and connected by a fusible link within the container to the first jelly roll structure. The fusible link may include a metal conductor having a reduced cross-sectional area and a ceramic or oxide coating on the conductor surrounding the reduced cross-sectional area. The first jelly roll structure may include a first connector, the second jelly roll structure may include a second connector overlapping and welded to the first connector, and the fusible link may define at least one aperture extending through the overlapping welded portion of the first and second connectors. Each cell may include at least one terminal connected by a fusible link within the container to the first jelly roll structure. The container may be a rigid prismatic container or a flexible pouch. The electrified vehicle battery may include a third jelly roll structure having its cathode, separator, and anode layers disposed within the container and connected by a fusible link within the container to the second jelly roll structure. The first, second, and third jelly roll structures may be connected in parallel or in series.

In one or more embodiments, a first jelly roll structure includes a conductive connector connected to the other jelly roll structure by a fusible link formed by a portion of the connector having a reduced cross-sectional area. The reduced cross-sectional area may correspond to an area having at least one aperture extending through the conductive connector. The portion of the connector having a reduced cross-sectional area may be coated with a ceramic or oxide material. The fusible link may be connected between a cathode on a first jelly roll structure and an anode on the second jelly roll structure. In various embodiments, the fusible link is connected between a cathode of the first jelly roll structure and a cathode of the second jelly roll structure.

Embodiments may also include a method for manufacturing a battery comprising electrically connecting a first laminar structure having cathode and anode by a fusible link to a second laminar structure having cathode, separator, and anode, disposing the first laminar structure, the second laminar structure, and the fusible link within a container, and electrically connecting a first battery terminal to the first cathode and a second battery terminal to the first anode. For applications including multiple jelly roll structures inside the can/pouch container, leads from multiple cathodes may be electrically connected to one another and leads from multiple anodes may be electrically connected to one another, with at least one cathode and at least one anode in turn connected to respective main battery cell terminals. The method may also include forming an aperture in a connector that connects the first laminar structure to the second laminar structure to form the fusible link. The method may also include applying a ceramic or oxide coating surrounding the aperture that connects the first laminar structure to the second laminar structure. In one embodiment, the method includes forming a fusible link by reducing a cross-sectional area of a connector electrically connecting the first laminar structure to the second laminar structure.

In various embodiments, the method comprises electrically connecting laminar structures within a battery cell by welding a portion of a connector of a first laminar structure to an overlapping portion of a connector of a second laminar structure. The method may further include forming an area of reduced cross-sectional area within the overlapping portion to form the fusible link, which may include forming one or more apertures within the overlapping portion. An oxide or ceramic coating may be applied to the overlapping portion.

In one or more embodiments, a battery includes battery cells each comprising a container, a first jelly roll electrically connected to a second jelly roll by a fusible link, the first and second jelly rolls and the fusible link being disposed within the container, and terminals electrically connected to the first jelly roll and extending from the container. The fusible link may be formed by a reduced cross-sectional area of a connector connecting the first and second jelly rolls, and may be coated with a ceramic or oxide layer. The reduced cross-sectional area may be formed by one or more apertures extending through the connector connecting the first and second jelly rolls. Each battery cell may also include a fusible link connecting at least one of the terminals to the first jelly roll.

One or more embodiments according to the disclosure may provide associated advantages. For example, a fusible link between laminar structures within a cell may reduce the effect of an internal short circuit path within one of the structures on the other structures within the cell as well as the potential effect on other cells within the battery pack. A ceramic or oxide coating surrounding the fusible link may reduce or eliminate arcing or sparking associated with high current flow through the fusible link that severs the electrical connection to the affected structure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
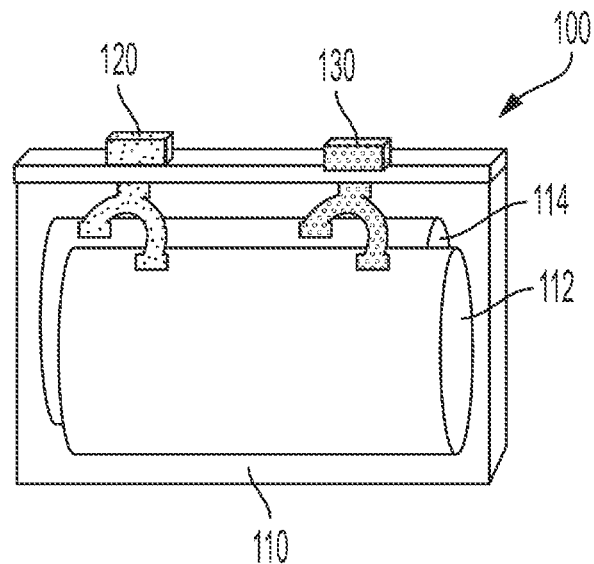
FIG. 1 illustrates a battery cell having two internal jelly rolls connected in parallel by a fusible link.
Figure 2:
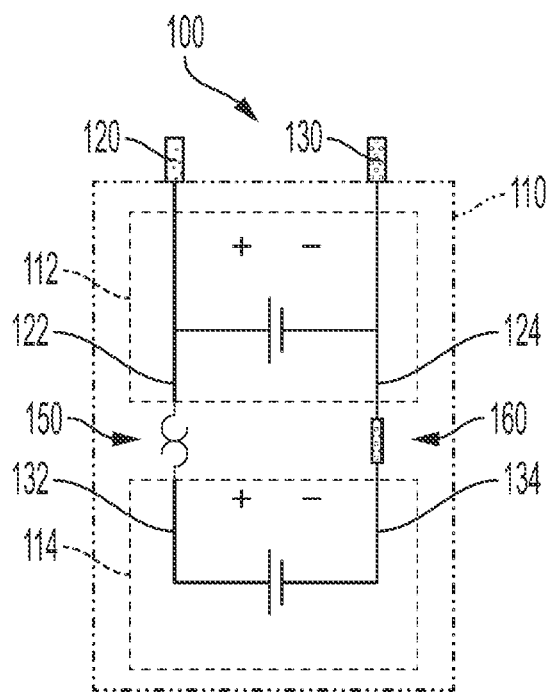
FIG. 2 illustrates a prismatic cell with jelly rolls connected in parallel by a fusible link.

FIGS. 1 and 2 illustrate a lithium-ion battery cell having two internal jelly rolls connected by a fusible link. Battery cell 100 may be one of a plurality of battery cells connected together within an electrified vehicle battery pack. Battery cell 100 includes a container 100, a first jellyroll 112 disposed within the container 100, and a second jellyroll 114 disposed within the container 100. The first jellyroll 112 and the second jellyroll 114 are connected in parallel to a positive terminal 120 and a negative terminal 130 as shown in the circuit schematic of FIG. 2. As such, the first jelly roll 112 and the second jellyroll 114 will be at the same voltage level or state of charge (SOC) during the battery operation. The container 100 is filled with an electrolyte and sealed. The positive terminal 120 and negative terminal 130 extend outside of the container 100 for connection to other battery cells within the battery pack. Container 100 may be implemented by a rigid prismatic container or a flexible package or pouch.

As generally understood by those of ordinary skill in the art, each jelly roll 112, 114 is a laminar stack or structure including a cathode layer, a separator, and an anode layer that are wound to form the structure referred to as a jelly roll or Swiss roll. In the representative embodiment illustrated, each jellyroll 112, 114 has a generally cylindrical laminar structure. Other embodiments may include a flattened jellyroll that has an oval laminar structure, or a Z-fold laminar structure rather than a wound laminar structure, for example. The anode may be formed from a metallic current collector, such as a copper foil having an active coating, such as graphite or other active material. The cathode may be formed from a metallic conductor, such as aluminum having an active coating, such as lithium/mixed transition metal oxide or a lithium phosphate. The laminar structures may be connected in parallel with cathodes connected together and anodes connected together (as in FIG. 2), or in series with a cathode connected to an anode of an adjacent structure and vice versa (as in FIG. 5) depending on the particular application and implementation. The electrically conductive terminals 120, 130 may be connected to the respective cathode and anode of a single laminar structure or to respective cathodes and anodes of multiple laminar structures within the cell 100. Similarly, individual cells 100 may be connected in parallel or series within an electrified vehicle battery pack.

As described in greater detail with reference to FIGS. 2-6, battery cell 100 includes at least one fusible link 150 disposed within container 110. The fusible link 150 may be formed in the connection between first jellyroll 112 and second jellyroll 114 and/or in the connection to positive terminal 120 and/or negative terminal 130 (as in FIG. 4). First jellyroll 112 may include a first conductor or connector 122 and a second conductor or connector 124 that are electrically connected to corresponding connectors 132, 134 of second jelly roll 114. The first jellyroll 112 and second jellyroll 114 connectors may be connected by welding of an overlapping portion 160 of the connectors. The fusible link 150 is a portion of the connector having reduced cross-sectional area that operates to provide an upper limit for current flow by creating an open circuit when current through the fusible link causes severing of the conductor. Fusible link 150 may be formed in an overlapping welded region 160 of the connector.

Figure 3A:
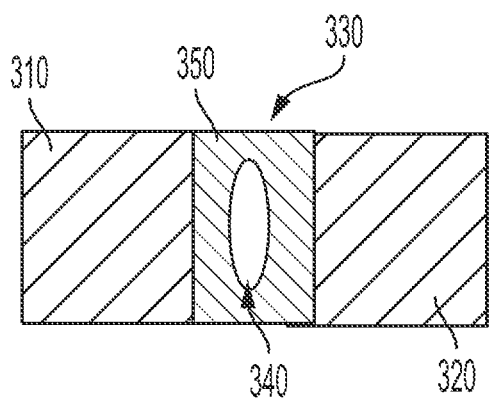
FIGS. 3A-3B illustrate representative fusible links having reduced cross-sectional area, thickness, etc. for restricting high current flow.
Figure 3B:
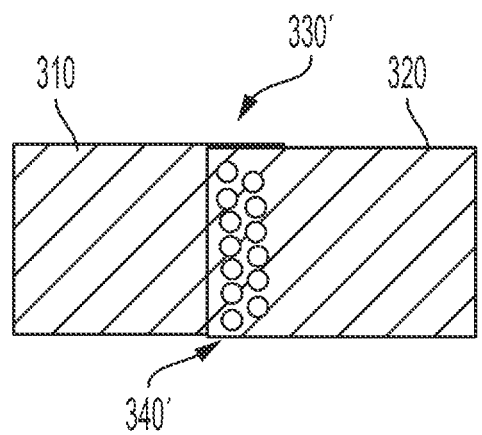

In various embodiments, fusible link 150 is formed by one or more apertures (as shown in FIGS. 3A-3B), which may be formed in any portion of the connector. In various embodiments, fusible link 150 is formed by one or more apertures extending through the overlapping welded region 160 of the connector. The fusible link portion and/or surrounding area of the conductor may be coated with a ceramic material or oxide (as in FIG. 3A), such as $Al_2O_3$ or $ZrO_2$, to inhibit arcing/sparking associated with rapid reduction of current flow during such events.

FIGS. 3A-3B illustrate representative fusible links having reduced cross-sectional area, thickness, etc. for limiting current flow. As illustrated in FIG. 3A, a fusible link 330 is formed between a first electrically conductive connector 310 of a first laminar stack or structure, such as jellyroll 112 (FIGS. 1, 2) and a second electrically conductive connector 320 of a second laminar stack or structure, such as jellyroll 114 (FIGS. 1, 2). Fusible link 330 may be formed in a portion of connector 310, a portion of connector 320, or in an overlapping portion of connectors 310, 320. Alternatively, fusible link 330 may be a separate component electrically connected to connectors 310, 320. Fusible link 330 provides a reduced cross-sectional area 340 relative to the cross-sectional areas of the adjacent portions of connectors 310, 320.

In the representative example illustrated in FIG. 3A, fusible link 330 includes an aperture 340, which reduces the cross-sectional area. The reduced cross-sectional area may provided by various mechanical or chemical means, such is pressing or rolling or chemical etching to reduce the average thickness of the conductive material within the fusible link portion of the connectors. Fusible link 340 and the surrounding area may be coated with a ceramic or oxide, generally indicated at 350, to inhibit arcing/sparking associated with rapid cessation of current resulting from an open circuit.

FIG. 3B illustrates another example of a fusible link 330' joining connectors 310, 320 of corresponding laminar structures. Fusible link 330' may be formed by a plurality of apertures 340' that reduce the cross-sectional area of the conductive portion between the connected laminar structures. Similar to the single aperture 340 illustrated in FIG. 3B, fusible link 330' may be formed in connector 310, in connector 320, in an overlapping welded portion of connectors 310, 320, or as a separate component electrically connected to connectors 310, 320 depending on the particular application and implementation.

Figure 4:
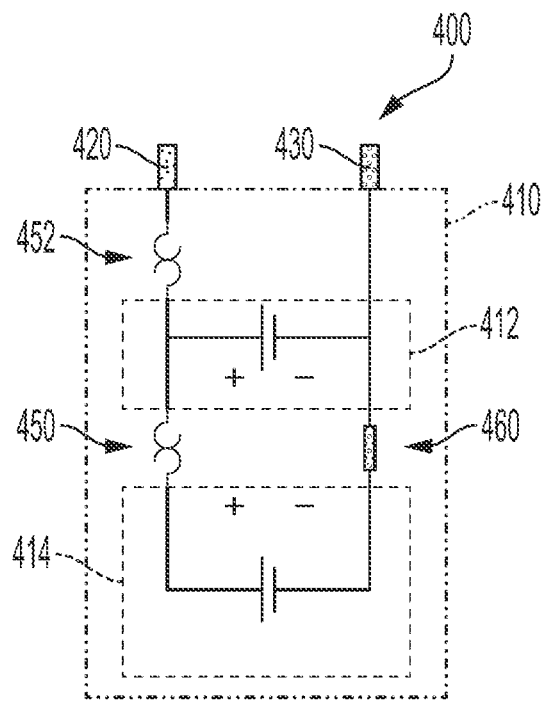
FIG. 4 illustrates a battery cell with fusible links connecting jelly roll structures in parallel and connecting the structures to a cell terminal.

FIG. 4 illustrates a battery cell 400 with fusible links 450, 452 connecting laminar structures in parallel and connecting the structures to a cell terminal 420. Battery cell 400 includes a first laminar structure 412 and a second laminar structure 414 disposed within a sealed container 410 containing an electrolyte. A first fusible link 450 connects first laminar structure 412 to second laminar structure 414. A second fusible link 452 connects first laminar structure 412 to positive voltage cell terminal 420, or alternatively to negative terminal 430. Fusible link 450 may be formed as previously described in an overlapping region 460 of the connectors, or in either connector associated with laminar structure 412 or 414.

Figure 5:
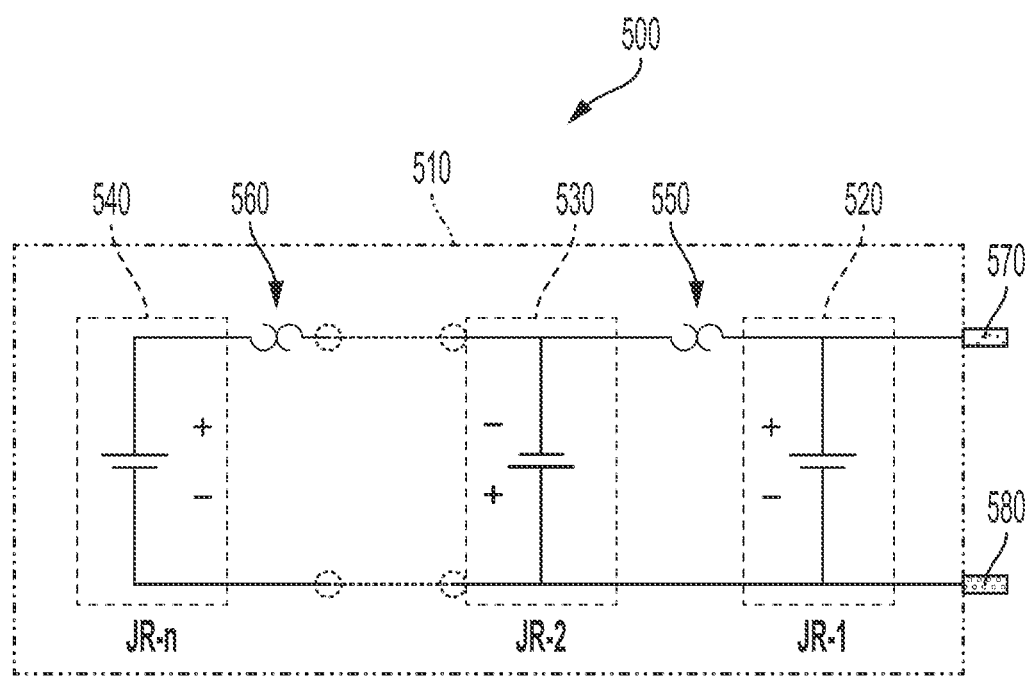
FIG. 5 illustrates a battery cell with multiple jelly roll structures connected in series by fusible links.

FIG. 5 illustrates a battery cell 500 with multiple laminar structures 520, 530, 540 connected in series by fusible links 550, 560. Laminar structures 520, 530, 540 are disposed within a container 510 and connected in series with the cathode of a first laminar structure 520 connected to an anode of an adjacent second laminar structure 530. Likewise, the anode of the first laminar structure 520 is connected to the cathode of the adjacent second laminar structure 530. Fusible links 550, 560 are formed in at least one of the connectors (i.e. cathode or anode) between adjacent laminar structures 520, 530, 540. A fusible link may also be provided between laminar structure 520 and positive cell terminal 570 and/or negative cell terminal 580.

Figure 6:
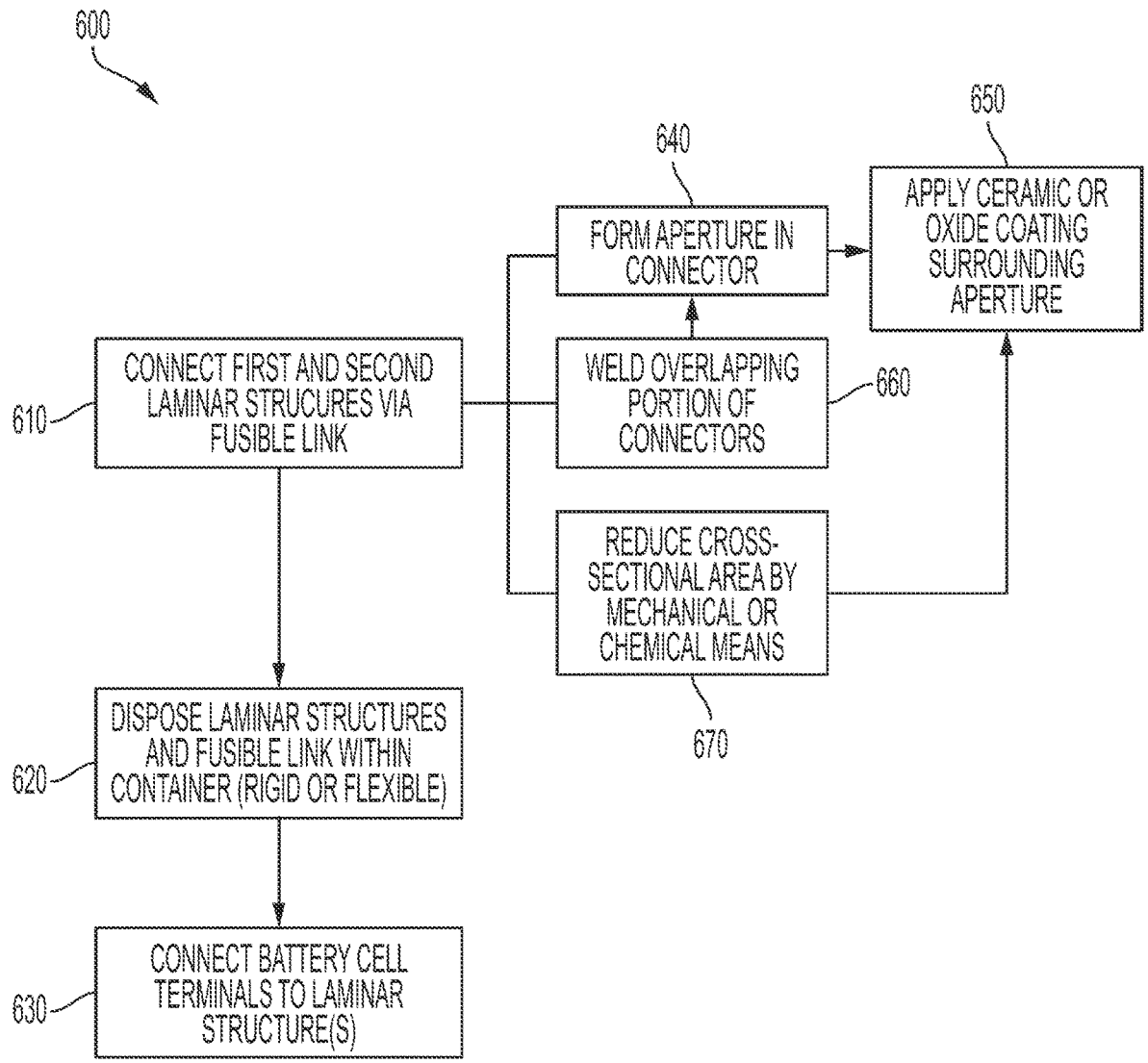
FIG. 6 is a diagram illustrating a method of manufacturing a battery having jelly roll stacks or structures connected by fusible links.

FIG. 6 is a diagram illustrating a method 600 of manufacturing a battery having jelly rolls connected by fusible links. Various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed. Similarly, the order of processing is not necessarily required to achieve the features and advantages of the claimed subject matter as described herein, but is provided for ease of illustration and description.

Method 600 may include electrically connecting a first laminar structure having a cathode and anode by a fusible link to a second laminar structure having cathode and anode as represented at 610. The method may include disposing the first laminar structure, the second laminar structure, and the fusible link within a container as represented at 620. The method may also include electrically connecting a first battery cell terminal to the first cathode and a second battery cell terminal to the first anode as represented at 630. Connecting the laminar structures by a fusible link may include forming an aperture in a connector that connects the first laminar structure to the second laminar structure to form the fusible link as represented at 640. The method may also include applying a ceramic coating surrounding the aperture that connects the first laminar structure to the second laminar structure as represented at 650.

In various embodiments, connecting the laminar structures may include welding a portion of a connector of the first laminar structure to an overlapping portion of a connector of the second laminar structure as represented at 660, wherein step 640 includes forming an aperture within the overlapping portion to form the fusible link. Step 610 may include forming the fusible link by reducing a cross-sectional area of a connector electrically connecting the first laminar structure to the second laminar structure as represented at 670.

While representative embodiments are described above, it is not intended that these embodiments describe all possible forms encompassed by the claims. The words used in the specification are words of description rather than limitation, and it is understood that various changes can be made without departing from the claimed subject matter. As previously described, the features of various representative embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not necessarily outside the scope of the disclosure or claimed subject matter and may be desirable for particular applications.

What is claimed is:

1. An electrified vehicle battery including a plurality of battery cells, each comprising:
   a container;
   a first laminar structure having cathode, separator, and anode layers disposed within the container; and
   a second laminar structure having cathode, separator, and anode layers disposed within the container, the second laminar structure connected by a fusible link within the container to the first laminar structure the fusible link comprising a metal conductor with a ceramic or oxide coating.

2. The electrified vehicle battery of claim 1 wherein the first laminar structure includes a first connector, the second laminar structure includes a second connector overlapping and welded to the first connector, and the fusible link defines at least one aperture extending through the overlapping welded portion of the first and second connectors.

3. The electrified vehicle battery of claim 2 further comprising at least one battery terminal connected by a fusible link within the container to the first laminar structure.

4. The electrified vehicle battery of claim 2 wherein the container comprises a rigid prismatic container.

5. The electrified vehicle battery of claim 1 further comprising a third laminar structure having cathode, separator, and anode layers disposed within the container, the third laminar structure connected by a fusible link within the container to the second laminar structure.

6. The electrified vehicle battery of claim 5 wherein the first, second, and third laminar structures comprise jelly rolls connected in parallel.

7. The electrified vehicle battery of claim 1 wherein the first laminar structure includes a conductive connector connected to the laminar structure and wherein the fusible link comprises a portion of the conductive connector having a reduced cross-sectional area.

8. The electrified vehicle battery of claim 7 wherein the reduced cross-sectional area corresponds to at least one aperture extending through the conductive connector.

9. The electrified vehicle battery of claim 7 wherein the portion of the connector having a reduced cross-sectional area is coated with the ceramic or oxide coating material.

10. The electrified vehicle battery of claim 1 wherein the first and second laminar structures are connected in series.

11. The electrified vehicle battery of claim 1 wherein the first and second laminar structures are connected in parallel.

12. A method for manufacturing a battery, comprising:
electrically connecting a first laminar structure by a fusible link having a ceramic or oxide coating to a second laminar structure;
disposing the first laminar structure, the second laminar structure, and the fusible link within a container; and
electrically connecting battery terminals extending from the container to the first laminar structure.

13. The method of claim 12 further comprising:
forming an aperture in a connector that connects the first laminar structure to the second laminar structure to form the fusible link.

14. The method of claim 13 further comprising:
applying the ceramic or oxide around the aperture that connects the first laminar structure to the second laminar structure.

15. The method of claim 12 wherein the step of electrically connecting comprises welding a portion of a connector of the first laminar structure to an overlapping portion of a connector of the second laminar structure, the method further comprising forming an aperture within the overlapping portion to form the fusible link.

16. The method of claim 12 further comprising forming the fusible link by reducing a cross-sectional area of a connector electrically connecting the first laminar structure to the second laminar structure.

17. A battery comprising:
a container;
a first jelly roll electrically connected to a second jelly roll by a fusible link having a ceramic or oxide coating, the first and second jelly rolls and the fusible link being disposed within the container; and
terminals electrically connected to the first jelly roll and extending from the container.

18. The battery of claim 17 wherein the fusible link is formed by an aperture extending through a connector connecting the first and second jelly rolls.

19. The battery of claim 17 further comprising a fusible link connecting at least one of the terminals to the first jelly roll.

* * * * *